(12) United States Patent
Kogan et al.

(10) Patent No.: US 12,412,570 B2
(45) Date of Patent: Sep. 9, 2025

(54) DETERMINING AND UTILIZING SECONDARY LANGUAGE PROFICIENCY MEASURE

(71) Applicant: GOOGLE LLC, Mountain View, CA (US)

(72) Inventors: David Kogan, Natick, MA (US); Wangqing Yuan, Wilmington, MA (US); Guanglei Wang, Cambridge, MA (US); Vincent Lacey, Mountain View, CA (US); Wei Chen, Belmont, MA (US); Shaun Post, San Mateo, CA (US)

(73) Assignee: GOOGLE LLC, Mountain View, CA (US)

( * ) Notice: Subject to any disclaimer, the term of this patent is extended or adjusted under 35 U.S.C. 154(b) by 255 days.

(21) Appl. No.: 18/103,277

(22) Filed: Jan. 30, 2023

(65) Prior Publication Data
US 2023/0177264 A1    Jun. 8, 2023

Related U.S. Application Data

(63) Continuation of application No. 17/351,861, filed on Jun. 18, 2021, now Pat. No. 11,568,139.

(51) Int. Cl.
*G10L 15/19*    (2013.01)
*G06F 3/0482*    (2013.01)
(Continued)

(52) U.S. Cl.
CPC .......... *G10L 15/19* (2013.01); *G06F 3/0482* (2013.01); *G06F 40/263* (2020.01);
(Continued)

(58) Field of Classification Search
CPC ....... G10L 15/065; G10L 15/07; G10L 15/06; G10L 15/22; G10L 2015/226; G10L 2015/227; G10L 2015/228
See application file for complete search history.

(56) References Cited

U.S. PATENT DOCUMENTS

| 7,778,948 B2 | 8/2010 | Johnson |
| 9,947,322 B2 | 4/2018 | Kang et al. |

(Continued)

FOREIGN PATENT DOCUMENTS

| WO | 2013172707 | 11/2013 |

OTHER PUBLICATIONS

European Patent Office; Invitation to pay Additional Fees issued in Application No. PCT/US2021/063640; 20 pages; dated Apr. 28, 2022.
(Continued)

*Primary Examiner* — Samuel G Neway
(74) *Attorney, Agent, or Firm* — Gray Ice Higdon

(57) ABSTRACT

Implementations relate to determining a secondary language proficiency measure, for a user in a secondary language (i.e., a language other than a primary language specified for the user), where determining the secondary language proficiency measure is based on past interactions of the user that are related to the secondary language. Those implementations further relate to utilizing the determined secondary language proficiency measure to increase efficiency of user interaction(s), such as interaction(s) with a language learning application and/or an automated assistant. Some of those implementations utilize the secondary language proficiency measure in automatically setting value(s), biasing automatic speech recognition, and/or determining how to render natural language output.

19 Claims, 7 Drawing Sheets

(51) Int. Cl.
   *G06F 40/263* (2020.01)
   *G06F 40/279* (2020.01)
   *G10L 15/06* (2013.01)
   *G10L 15/065* (2013.01)
   *G10L 15/07* (2013.01)
   *G10L 15/22* (2006.01)

(52) U.S. Cl.
   CPC ............ *G06F 40/279* (2020.01); *G10L 15/06* (2013.01); *G10L 15/065* (2013.01); *G10L 15/07* (2013.01); *G10L 15/22* (2013.01); *G10L 2015/226* (2013.01); *G10L 2015/227* (2013.01); *G10L 2015/228* (2013.01)

(56) References Cited

U.S. PATENT DOCUMENTS

| | | | |
|---|---|---|---|
| 10,594,757 | B1 | 3/2020 | Shevchenko |
| 10,885,809 | B2 | 1/2021 | Roche |
| 11,568,139 | B2* | 1/2023 | Kogan ................ G06F 9/44505 |
| 2002/0086268 | A1* | 7/2002 | Shpiro ................... G09B 19/04 434/156 |
| 2006/0173683 | A1* | 8/2006 | Roth ..................... G10L 15/183 704/251 |
| 2007/0294084 | A1* | 12/2007 | Cross ...................... G10L 15/22 704/E15.044 |
| 2008/0167871 | A1* | 7/2008 | Kim ........................ G10L 15/22 704/E15.04 |
| 2010/0185435 | A1 | 7/2010 | Deshmukh |
| 2014/0335483 | A1 | 11/2014 | Buryak et al. |
| 2015/0278192 | A1* | 10/2015 | Bretter .................... G10L 15/00 704/9 |
| 2016/0307568 | A1* | 10/2016 | Zhao ....................... G10L 15/08 |
| 2018/0158365 | A1 | 6/2018 | Roche |
| 2019/0019501 | A1* | 1/2019 | Sharifi .................... G10L 13/00 |
| 2019/0122574 | A1* | 4/2019 | Amin ...................... G06F 16/40 |
| 2019/0172446 | A1* | 6/2019 | Friedman ................ G06F 3/167 |
| 2019/0189116 | A1* | 6/2019 | Li ......................... G10L 15/1822 |
| 2020/0134013 | A1* | 4/2020 | Pasternack ............ G06F 40/263 |
| 2020/0286473 | A1 | 9/2020 | Anders et al. |
| 2021/0366468 | A1* | 11/2021 | Krishnamoorthy ...... G06N 3/08 |
| 2022/0405471 | A1* | 12/2022 | Kogan ................... G06F 3/0482 |
| 2023/0177264 | A1* | 6/2023 | Kogan ................... G06F 40/30 704/1 |
| 2023/0325590 | A1* | 10/2023 | Shevchenko .......... G06N 20/00 715/200 |

OTHER PUBLICATIONS

Qian Y. et al.; Spoken Language Understanding of Human-Machine Conversations for Language Learning Applications; Journal of Signal Processing Systems; pp. 805-817; dated 2020.

European Patent Office; International Search Report and Written Opinion issued in Application No. PCT/US2021/063640; 22 pages dated Jun. 22, 2022.

European Patent Office; Communication pursuant to Rule 164(2)(b) and Article 94(3) EPC issued in Application No. 21851892.6; 15 pages; dated Jul. 1, 2024.

European Patent Office, Intention to Grant issued in Application No. 21851892.6; 53 pages; dated May 22, 2025.

\* cited by examiner

DETERMINING AND UTILIZING SECONDARY LANGUAGE PROFICIENCY MEASURE

BACKGROUND

A user may have interest in having content that is not in the same language as the primary language of the user provided in response to interactions of the user. For example, a user may utter one or more phrases in a secondary language, to an automated assistant, that would require recognition of the utterance in a language other than the primary language of the user. In many instances, an automatic speech recognition model is configured to recognize utterances in the primary language of the user and is less likely to recognize utterances in a secondary language. In those instances, the automated assistant may be unable to respond to such utterances and/or may misinterpret the utterances by attempting to understand the utterances as terms in the primary language of the user.

As another example, a user may have interest in learning a secondary language but may not effectively identify resources for learning the language that are directed to users with the proficiency of the user and/or other knowledge of the user. For example, a user may be provided with translations of a phrase but the phrase may be too complex for a user to fully comprehend in its entirety. This can result in the user not utilizing resources of an automated assistant that would otherwise be capable of assisting in the language learning process.

SUMMARY

Implementations disclosed herein relate to determining a secondary language proficiency measure, for a user in a secondary language (e.g., a language other than a primary language specified for the user and/or a language that the user has interest in learning), where determining the secondary language proficiency measure is based on past interactions of the user that are related to the secondary language. Those implementations further relate to utilizing the determined secondary language proficiency measure to increase efficiency of one or more user interactions (e.g., interaction(s) with a language learning application and/or an automated assistant).

In some instances, a user may have multiple primary languages. For example, a user may be fluent in both English and French, and may therefore be capable of submitting well-formed phrases in both languages. Further, in some instances, a user may have one or more secondary languages in which the user is less fluent. For example, a user may be currently learning both Spanish and Italian, and both languages may be indicated as secondary languages for the user. Further, a user may specify a language as a primary language in instances where the user intends to converse in a language but the language is still a secondary language for the user. For example, a user may be a speaker of English but indicate that French is a primary language. One or more signals can be utilized to determine that the user is learning French (i.e., the language is the second language of the user) even though the user has indicated English as a primary language.

As one example, the secondary language proficiency measure can be utilized to automatically set value(s) for one or more parameters of adjustable settings of a graphical user interface (GUI) of a language learning application. For instance, a value of "Spanish" can be automatically set for a user that has interest, based on the past interactions of the user, in learning Spanish and/or a value of "beginner" can be automatically set for a language proficiency level for the user. Automatically setting the value(s), in view of the secondary language proficiency measure, obviates user input(s) that would otherwise be required to manually set the value(s) and enables user interaction with the GUI of the language learning application to conclude more quickly. Moreover, in various implementations the secondary language proficiency measure can be generated based on (e.g., based solely on) interactions that are not interactions with the language learning application. This enables automatically setting the value(s) in an initial interaction of the user with the GUI and/or enables the value(s) to be automatically dynamically adjusted, over time, in view of interactions that are external to the language learning application. In addition to the computational efficiencies achieved through obviating input(s) with the GUI and/or enabling quicker interaction with the GUI, automatically setting the value(s) mitigates occurrences of the language learning application utilizing, in interactions with the user, inaccurate settings. Utilization of inaccurate settings by the language learning application can result in computationally wasteful interactions with the user such as rendering of secondary language output that is too simplistic or too complex to be of benefit to the user.

As another example, the secondary language proficiency measure can additionally or alternatively be utilized to increase the accuracy of automatic speech recognition (ASR) that is performed, using an ASR model for the secondary language, on secondary language spoken utterances of the user that are in the secondary language. For instance, implementations select, from a superset of terms for the secondary language, a subset of terms for the secondary language based on the determined secondary language proficiency measure, and utilize the selected subset of terms to bias ASR that is performed for secondary language utterances of the user. The subset of terms can include, for example, terms that the user is likely to be learning based on the secondary language proficiency measure and can optionally exclude term(s) that the user is unlikely to be learning and/or has already mastered. In these and other manners, spoken utterances of the user are more likely to be accurately recognized, preventing occurrences of errant interactions that are based on inaccurate ASR and/or preventing occurrences of a repeat of spoken utterances that were inaccurately recognized. The secondary language ASR can be utilized in processing spoken utterances of the user that are provided in interactions with the language learning application, in general interactions of the user with an automated assistant, and/other interactions of the user.

As another example, the secondary language proficiency measure can additionally or alternatively be utilized to determine how to render (e.g., audibly and/or visually), to the user, natural language output that is in the secondary language. For example, natural language output text can be split into a plurality of subtexts, where a quantity of the subtexts and/or an amount of text in each of the subtexts can be determined based on the secondary language proficiency measure. Further, each of the subtexts can be rendered with a demarcation relative to other of the subtexts. For instance, with visual rendering each of the subtexts can be rendered as a visually demarcated separate block, such as a block that is vertically offset relative to the rendering of any preceding and/or following block. Also, for instance, with audible rendering through speech synthesis of the text, a demarcating pause in speech and/or a demarcating earcon can be rendered between each of the subtexts. Generally, more subtexts and/or smaller size subtexts will be provided with a lower secondary language proficiency measure while lesser subtexts and/or larger size subtexts will be provided with a higher secondary language proficiency measure. In these and other manners, secondary language output is rendered in view of the secondary language proficiency measure. This can make the output more understandable (through more and/or smaller subtexts) for a lesser proficiency user, while making the rendering shorter (in the case of audible rendering) and/or take up less screen real estate (in the case of visual rendering) for a higher proficiency user. Accordingly, the output can be adapted to increase comprehension where appropriate, while promoting audible and/or visual efficiencies where appropriate. Such adaptations with rendering can occur in natural language output that is generated by the language learning application and/or in interactions with other application(s), such as general automated assistant interactions with an automated assistant application (e.g., where the automated assistant application may provide both a primary language response and a secondary language response).

A user can select a primary language for an account to indicate the language that the user prefers to primarily utilize for providing queries and receiving responses to queries. In some instances, the user may have interest in learning a secondary language (i.e., a language other than the language selected as the primary language of the user) and can utilize one or more tools, such as a language learning application, to assist in learning the language. Further, the user may provide audio data that the user has interest in being translated to the secondary language and/or may provide audio data that is in the secondary language of the user. However, to initiate usage of language learning tools and/or to indicate the level of language proficiency of the user, a language learning application and/or other functionality may require a setup and/or registration process, which may include setting input parameters in order for the application to provide tools for learning the secondary language at the proficiency level of the user. For example, in some instances, the user may have little or no proficiency in the secondary language, which may require simple vocabulary and grammar to be provided to the user in order for the user proficiency to improve. In other instances, the user may have some proficiency with the secondary language (e.g., some knowledge of vocabulary and grammar rules), and therefore have interest in being provided with language learning tools that are more advanced than those provided to a user that is a beginner in the secondary language.

By determining a secondary language proficiency measure for a user, a language learning application can be pre-populated with settings and/or parameters that indicate the secondary language proficiency of the user. Further still, the determined language proficiency measure can additionally and/or alternatively be utilized to bias a speech recognition model such that the speech recognition model can more accurately recognize terms spoken in the secondary language when identified in audio data provided by the user. Further still, the secondary language proficiency measure can be utilized in determining to provide translations of phrases in the secondary language such that the user is provided with subtexts of a phrase as individual translations instead of the entire phrase as one single translated phrase.

In some implementations, a language proficiency measure for the user may be determined based on past interactions of the user. The interactions can be between the user and one or more applications. In some instances, the secondary language proficiency measure can be determined based on the past interactions with particular applications. For example, interactions of the user with select applications may be utilized to determine a secondary language proficiency measure, while interactions of the user with other applications may not be utilized to determine the secondary language proficiency measure. As an example, in some implementations disclosed herein, past interactions of the user with one or more applications other than a secondary language learning application can be utilized to determine a secondary language proficiency measure.

In some implementations, one or more queries that are provided by the user via a spoken utterance may be utilized to determine a secondary language proficiency measure for the user. For example, the choice of vocabulary of the user, when submitting spoken queries in the secondary language, may be indicative of the proficiency of the user. Accordingly, the secondary language proficiency measure can be determined that reflects the limited vocabulary of the user. Also, for example, grammatical and/or pronunciation errors of the user, when submitting spoken queries in the secondary language, may be indicative of the secondary language proficiency of the user. Accordingly, a secondary language proficiency measure may be determined for a user that submit queries with grammatical and/or pronunciation errors that is less indicative of proficiency than a user that submit spoken queries that are grammatically correct.

In some implementations, interactions of the user that include the user submitting text in the secondary language may be utilized to determine a secondary language proficiency measure for the user. For example, with permissions from the user, emails of the user that include terms and/or phrases in the secondary language may be identified and, based on the correctness of the grammar and/or the selection of terms in the emails (or other documents) can be utilized to determine a secondary language proficiency measure for the user. Also, for example, auto-suggestions that are provided to the user when submitting queries can be utilized to determine a secondary language proficiency measure (e.g., common terms that are autocorrected can result in a determined secondary language proficiency measure that is less indicative of proficiency than a user that does not require autocorrect for the same common terms and/or phrases).

In some implementations, a secondary language proficiency measure can be determined for a user based on the user submitting queries (e.g., spoken queries and/or text queries) that are related to the secondary language but provided in the primary language of the user. For example, a user may submit a request to translate a phrase from the primary language of the user to the secondary language. The secondary language proficiency measure can be determined based on complexity of the phrases such that, for example, a user that submits requests for common terms may have a lower determined proficiency measure than a user that submits requests to translate more complex phrases.

In some implementations, user requests for additional information related to the secondary language can be utilized to determine a secondary language proficiency measure for the user. In some implementations, web activity of the user may be utilized to determine a secondary language proficiency measure for the user. For example, in addition to submitting requests to translate terms into the secondary language and/or submitting queries in the secondary language, the user may submit a request to be provided with additional resources related to learning the secondary language, such as "what is the best way to learn Spanish" or "take me to a website for learning French." Also, for example, the user may navigate to a webpage that is related to learning the secondary language. Also, for example, the user may navigate to webpages that include content that is in the secondary language. In some implementations, interactions of the user with one or more language learning applications can be utilized to determine a secondary language proficiency measure for the user. For example, a user may download an application that is utilized to learn the secondary language, interact with one or more applications that are related to learning the secondary language, and/or otherwise utilize an application that, through the interactions of the user, may be used to determine a secondary language proficiency measure for the user.

Based on the secondary language proficiency measure, a vocabulary and/or set of grammar rules can be determined for the user that is appropriate for the proficiency level of the user. For example, based on the past interactions of the user, as described herein, a secondary language proficiency measure can be determined along with a set of terms, phrases, and/or grammar rules that the user has utilized in the past interactions. For example, a user may submit the query "How do you say hello in French" multiple times, which may indicate that the user has low proficiency in French and requires additional assistance in translation and/or pronunciation of "hello" in French. Thus, based on monitoring the past interactions of the user, a vocabulary of known terms can be determined as well as a vocabulary of terms that the user has not mastered but has indicated an interest in being provided multiple times.

In some implementations, subsequent interactions of the user (i.e., interactions that occur after the secondary language proficiency measure has been initially determined) may be utilized to adjust the secondary language proficiency measure of the user to reflect increased (or decreased) proficiency of the user. For example, as a user becomes more proficient in the secondary language, the user may submit queries and/or request translations that are more complex and/or include terms and/or grammar that indicates a level of proficiency that is more indicative of proficiency than previously determined. In those instances, the secondary language proficiency of the user can be reevaluated periodically and/or when the user utilizes vocabulary that is not included in the determined vocabulary for a user with the initially determined proficiency level.

In some implementations, the past interactions of the user that are related to the secondary language may be utilized to determine a user interest measure for the user that is indicative of user interest in learning the secondary language. For example, a user may submit one or more phrases and request the one or more phrases be translated into the secondary language. Also, for example, a user may interact with one or more applications that are configured to assist in language learning. Also, for example, the user may browse webpages with content in the secondary language, webpages related to learning the secondary language, and/or other resources that indicate the user has interest in a language other than the primary language of the user.

By determining a secondary language proficiency measure for the user (and, optionally or alternatively, a user interest measure indicating an interest by the user to be provided with additional resources directed to learning the secondary language), a secondary language learning application may be provided to the user. The secondary language learning application can be pre-configured and/or initialized based on the determined secondary language proficiency measure for the user such that the user is not required to complete a setup process to utilize the language learning application. Thus, the user may be provided with an indication that the language learning application is available and begin using the application without further processing and/or evaluation of the user language proficiency.

In some implementations, once a user language proficiency measure has been determined, one or more parameters of the language learning application can be set with values based on the determined language proficiency measure. Examples of parameters that may be set include, for example, target vocabulary for the user proficiency, exercises that are directed to grammatical rules that are appropriate for the user proficiency, and/or other aspects that are related to language learning that may be inferred from the secondary language proficiency measure. When the user accesses the language learning application, tools that are provided to the user can be tailored to the user's proficiency without requiring the user to manually set one or more of the parameters.

In some implementations, a user may be provided with a graphical user interface (GUI) with one or more parameters pre-set and/or one or more fields pre-filled with information that can be determined based on the secondary language proficiency of the user. For example, a GUI may have a dropdown menu of potential languages and, based on the past interactions of the user, the determined user interest of the user in learning a secondary language, and/or the user proficiency in a secondary language, the dropdown menu may be pre-filled with the identified secondary language of interest. Also, for example, a sliding bar may be provided in the GUI that indicates, on a scale of values, the proficiency of the user, with the sliding bar set at a value that is appropriate for the determined secondary language proficiency measure of the user.

In some implementations, the secondary language proficiency measure for a user may be utilized to bias a speech recognition model to improve recognition of one or more terms and/or grammar rules for a secondary language that a user may provide via an utterance. For example, a user may utilize an automated assistant that in turn utilizes a speech recognition model to translate audio data into a textual representation of the speech. In instances where a user utters one or more terms in a secondary language, the speech recognition model may be biased to recognize terms that are likely to be uttered by the user given the language proficiency measure of the user. For example, a user may have a secondary language proficiency measure that indicates that the user has comprehension of some basic vocabulary and/or phrases. The speech recognition model that is utilized to process speech of the user may be biased to additionally recognize terms in the secondary language that would not otherwise be given as much weight in typical use of the speech recognition model. For example, the user may utter a simple Spanish phrase (e.g., "Que tiempo hace," or "What time is it") and, based on the secondary language proficiency of the user, the speech recognition model may be biased to recognize the utterance of "que" as being a Spanish word that is likely to be used by the user in utterances. Thus, when the user utters "Que tiempo hace," the speech recognition model is more likely to recognize "que" as the intended Spanish word and less likely to identify the term as an English word, such as the letter "K" (a term with the same pronunciation as "que") that would otherwise be more likely to be spoken by a user with a primary language preference set to English.

In some implementations, the user may request translation of a phrase and be provided with the phrase translated into the secondary language of interest to the user. For example, the user may invoke an automated assistant and utter "how do you say 'what time is it' in Spanish." In some instances, the user may be provided with a textual indication of the translation along with an interactive icon that allows the user to hear the translation being spoken by a person in the secondary language (e.g., an audio clip of a user speaking in Spanish). However, in instances where a user requests a longer phrase to be translated, the user may have difficulty in practicing and/or understanding the entire translation, based on the current proficiency of the user in the secondary language. In those instances, the translated phrase can be split into smaller text blocks based on the secondary language proficiency measure of the user. For example, if the user has a secondary language proficiency measure indicative of low proficiency, the user may be provided with multiple smaller texts, each of which includes only a single word or small phrase (e.g., a first subtext of "Que," a second subtext of "tiempo," and a third subtext of "hace). For each of the provided subtexts, the user may be provided with an icon to listen to audio of the corresponding subtext. Similarly, a user with a secondary language proficiency measure that is indicative of a higher proficiency in the language, the translation (i.e., "que tiempo hace") can be provided as a single text with translation icon based on determining that the user is more likely to comprehend longer phrases.

Implementations described herein allow for one or more tools to be automatically tailored to the proficiency of the user while mitigating additional processing time that would otherwise be required to perform setup and initialization of language learning tools. For example, by prefilling one or more parameters of a GUI for a secondary language learning application, initial evaluation of user proficiency is not necessary. Instead, the language proficiency of the user may be passively determined based on the behavior of the user in the normal course of interactions of the user with one or more applications. Further implementations described herein allow for a speech recognition model to be biased towards only those terms and/or grammar that the user, given a particular proficiency measure, will likely utter in interactions with, for example, an automated assistant. In those instances, computing resources are not being expended to bias the speech recognition model to recognize terms and/or grammar that the user is unlikely to include in queries, given the secondary language proficiency of the user. Still further, implementations described herein reduce the likelihood that a user will make repeated translation requests by providing the translation in smaller subtexts. By splitting a translation into smaller texts, the user is less likely to request that a given translation be repeated, thus reducing resources required to perform the translation and/or repeat the translation.

DETAILED DESCRIPTION

Figure 1:
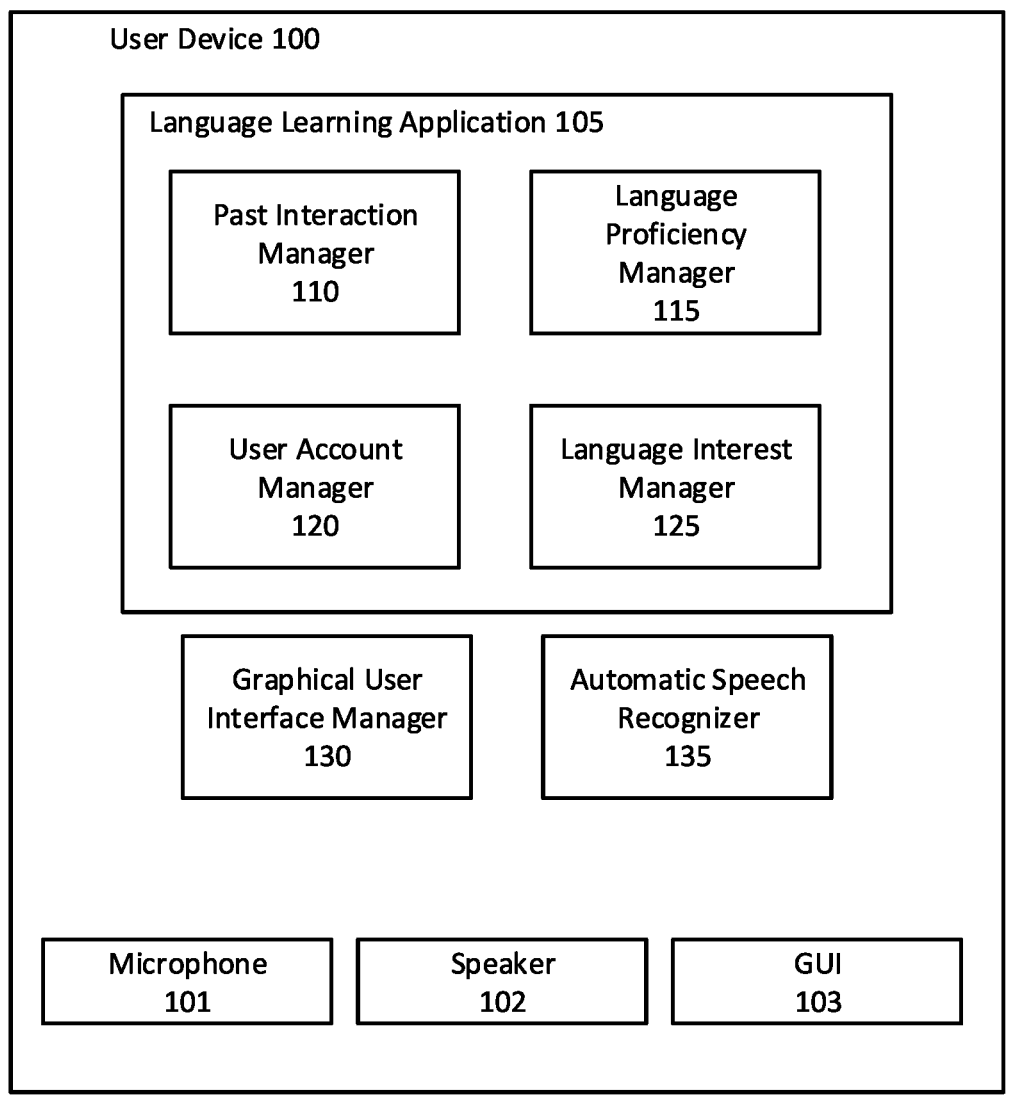
FIG. 1 is an illustration of an example environment in which implementations disclosed herein may be implemented.

Referring to FIG. 1, an example environment is provided that may be utilized to implement one or more embodiments disclosed herein. The example environment includes a user device 100 that is executing a language learning application 105. Further, the user device 100 includes a microphone 101, a speaker 102, and a graphical user interface (GUI) 103. Although illustrated in FIG. 1 as executing on user device 100, one or more components of language learning application 105 may be executing remotely from the user device 100. For example, one or more components of language learning application 105 may have a local component that is executing on user device 100 and one or more remote components that are executing on another device that is in communication with the user device 100, such as on a server that is in network communication with the user device 100.

The language learning application 105 includes a past interaction manager 110 that can monitor interactions of the user with one or more applications. Further, the language learning application 105 includes a language proficiency manager 115 that can determine, based on past interactions of the user, a secondary language proficiency measure indicative of user proficiency with the secondary language. Still further, the language learning application includes a user account manager 120 that includes account information for one or more users, such as parameters set by the user to indicate personal preferences. Further, language learning application 105 includes a language interest manager that can determine user interest in learning a secondary language. Further, the language learning application 105 includes a graphical user interface manager 130 to generate content and render the content via GUI 103 of the user device. User device 100 further includes an automatic speech recognizer 135, which can be utilized to receive speech, such as an utterance of the user via microphone 101 and convert the speech into one or more words for further processing. Speaker 102 may be utilized by one or more components, such as a text-to-speech component (not shown), to provide audio data to the user.

In some implementations, user account manager 120 can determine whether a particular language is the primary language of the user, or whether a particular language is secondary to the primary language of the user. For example, in setting up the language learning application 105 and/or one or more accounts that are executing one the user device 100, the user may be prompted to provide a primary language for future content. The account may be associated with the user device 100 (e.g., an initial account registration when the user device 100 is first accessed by the user), with the language learning application 105 (e.g., an initial setup of the application 105 when it is initially downloaded or accessed), and/or one or more other accounts that are associated with the user and can indicate preferences of the user.

In some implementations, a user may interact with one or more applications other than the language learning application. Past interaction manager 110 can analyze the interactions of the user to determine whether the user has accessed one or more applications and/or requested content that is related to a secondary language. For example, one or more databases may include stored information indicating user access of documents, query logs of interactions of the user with an automated assistant, webpages that the user has browsed, indications of media content that the has viewed, and/or other interactions of the user with one or more applications that are external to the language learning application 105.

In some implementations, past interaction manager 110 may identify, from the stored past interactions, one or more interactions that are related to a secondary language. For example, a user may view a webpage and past interaction manager 110 can determine whether the webpage that was viewed by the user is related to learning a secondary language and/or includes content that is presented in a secondary language. Also, for example, past interaction manager 110 may identify user interactions with one or more applications other than the language learning application 105. For example, user device 100 may have a Spanish language game application installed, and interactions of the user with the game application (e.g., indications of the user downloading the game application, accessing the game application) may be stored in one or more databases and/or otherwise identified by the past interactions manager 110.

In some implementations, past interactions may include the user issuing one or more queries in a secondary language. For example, a user may issue a textual query via a web browser (not shown) executing on the user device 100. Past interaction manager 110 may identify the textual query and determine that the query is in a secondary language (e.g., a language other than the primary language indicated by a user account of the user). Also, for example, a user may utter a query that is captured by microphone 101 and processed by automatic speech recognizer 135. Past interaction manager 110 can determine, based on the processed audio data, that at least a portion of the spoken utterance is in a secondary language.

In some implementations, the user may submit a query that is in the primary language of the user but related to a secondary language. For example, a user may utter the phrase "How do you say hello in Spanish," indicating that the user has interest in being provided a translation of a term from English to Spanish. Past interaction manager 110 can determine that the query, although in English, is related to Spanish. Based on determining that the query is related to Spanish, past interaction manager 110 can store the interaction in one or more databases for further processing by one or more other components. Also, for example, a user may submit a query requesting to have a phrase or term pronounced. For example, a user may submit a text query of "How do you say hola" to an application (e.g., a web browser) and the user may be provided with audio output via speaker 102 that includes audio of a speaker (either a human speaker or a speech simulation) pronouncing the term or phrase. The past interaction manager 110 may determine that the query, which includes at least a portion in a primary language of the user and a portion in a secondary language of the user, is related to a secondary language of the user.

In some implementations, past interaction manager 110 can identify interactions of the user with one or more applications. For example, user device 100 may have one or more language learning applications that are executing on the device, and past interaction manager 110 can identify that a user has accessed one or more of the applications. Also, for example, a user may utilize a web browser application executing on user device 100 to browse to one or more webpages that include language learning information (e.g., web-based interactive games, study tools) and past interaction manager 110 can determine that the user has accessed information that is related to learning a secondary language.

In some implementations, past interaction manager 110 may determine that the user has interacted with one or more applications that are related to a secondary language and store information related to those interactions in a database. In some implementations, past interaction manager 110 may identify terms and/or grammar rules that the user has utilized in interactions. For example, a user may submit a query of "que tiempo hace" and past interaction manager 110 may store indications of the vocabulary used by the user in a database. In some implementations, past interaction manager 110 may identify mistakes made by the user in utilizing a secondary language in interactions with one or more applications. For example, a user may submit a query of "time is it" instead of a well-formed query of "what time is it," and past interaction manager 110 can store one or more indications of the vocabulary and/or grammar rules that the user utilized incorrectly. In some implementations, a user may submit a request to translate a phrase into a secondary language and past interaction manager 110 can store an indication of the terms and/or phrases that were provided to the user in response to the request to translate. In some implementations, past interaction manager 110 can identify terms and/or phrases that were provided to a user while interacting with other applications, such as terms that are included in webpages that are accessed by the user, terms that were rendered to a GUI while the user is accessing a language learning application, and/or other vocabulary and/or concepts that the user was exposed to while interacting with other applications.

Language proficiency manager 115 can determine, based on the interactions identified by the past interaction manager 110, a secondary language proficiency measure for the user. Language proficiency manager 115 can determine, based on the interactions, terms and/or phrases utilized during interactions, and/or responses to queries that are related to the secondary language to determine a secondary language proficiency measure that is indicative of the user proficiency in the secondary language. For example, past interaction manager 110 may identify an interaction of the user that includes the user submitting a query with the term "hola" and language proficiency manager 115 can determine a secondary language proficiency measure that indicates that the user has at least a minimal proficiency in Spanish. As the user interacts with additional applications and past interaction manager 110 identifies the interactions that are related to Spanish, the language proficiency manager 115 can refine the secondary language proficiency measure for the user based on the additional terms and/or concepts that the user has utilized in queries, been provided by applications, and/or requested in queries.

In some implementations, a user may request that a phrase be translated. The terms that are provided to the user in response to the request can be utilized by language proficiency manager 115 to determine a secondary language proficiency measure for the user. For example, if the user issues a query of "How do I say hello in Spanish," language proficiency manager 115 may determine a language proficiency measure that is indicative of a low proficiency in a language based on determining that a user with a high proficiency in Spanish would be unlikely to require translation of the term "hello." Also, for example, if a user issues a request for a more complex phrase to be translated, language proficiency manager 115 may determine a secondary language proficiency measure that is more indicative of proficiency based on determining that a user with some proficiency in a language may still likely require some translation assistance with more complex phrases. The terms of the resulting translation may further be utilized to determine a secondary language proficiency measure for the user. For example, as the user receives translations, language proficiency manager 115 can utilize the resulting vocabulary to determine a secondary language proficiency measure that reflects the vocabulary and/or phrases to which the user has been exposed.

In some implementations, language proficiency manager 115 may determine a secondary language proficiency measure based on a quantity of translation requests submitted by the user. For example, if a user requests translations for the same or similar terms multiple times, language proficiency manager 115 may determine that the user is learning those terms and/or phrases but has not yet mastered their usage. Thus, a secondary language proficiency measure may be determined that indicates that those terms (or terms of similar complexity) are currently being learned by the user. As translation requests become more complex and/or repeated translation requests become less frequent, language proficiency manager 115 can update the secondary language proficiency measure for the user to reflect the user improving proficiency in the secondary language.

In some implementations, language proficiency manager 115 can determine a secondary language proficiency measure for a user based on the grammar and/or vocabulary that the user uses when sending a query in the secondary language. For example, assuming the secondary language is English, past interactions manager 110 may identify a first user submitting a query of "time it is" and language proficiency manager 115 can determine a secondary language proficiency measure that is indicative of low proficiency based on the limited vocabulary and/or grammatical errors of the submitted query. Also, for example past interaction manager 110 may identify a second user submitting a query of "what time is it" and language proficiency manager 115 may determine a secondary language proficiency measure for the second user that is more indicative of proficiency than the first user based on determining that the second user has submitted a query that is grammatically correct.

In some implementations, language proficiency manager 115 can determine a secondary language proficiency measure based on interactions of the user with one or more documents that include content in the secondary language. For example, a user may access a news webpage that is in the secondary language and browse the webpage. Language proficiency manager 115 can determine what vocabulary the user has viewed, how long the user spent viewing the webpage and/or portions of the webpage, what terms from the webpage were submitted for translation, and/or other indications of user exposure to the secondary language that may be indicative of proficiency of the user in the secondary language. Also, for example, a user may access a video that includes subtitles in the secondary language (or, conversely, a video in a secondary language that has subtitles in the primary language of the user). Language proficiency manager 115 may determine a secondary language proficiency measure for the user based on the length of time that the user watched the video, the vocabulary used in the video, whether the user activated the subtitles, how long the user activated the subtitles, differences in subtitle usage between viewings of the video, and/or other interactions that can indicate a proficiency level of the user.

In some implementations, language proficiency manager 115 may identify other errors that the user has made in submitting requests. For example, past interactions manager 110 may monitor the usage of autocorrect that was utilized by the user when submitting a query and/or typing a phrase in a document (e.g., word processor document, email). Language proficiency manager 115 can determine a secondary language proficiency measure based on determining which terms and/or grammatical rules were initially incorrectly utilized, which autocorrection suggestions were selected by the user, and/or the complexity of the suggestions that were selected (e.g., the user selecting a correct and more complex suggestion that the initially submitted terms and/or phrase).

In some implementations, a number of past interactions with one or more applications, other than language learning application 105, can be utilized by language proficiency manager 125 to determine a secondary language proficiency measure for the user. For example, language proficiency manager 115 may determine that the number of instances that a user interacted with an application, as described herein, satisfies a threshold. Thus, language proficiency manager 115 may determine that a user that has not interacted with applications in a manner related to the secondary language a threshold number of times is less proficient that a second user that has interacted with applications in a manner related to the secondary language. As another example, language proficiency manager 115 may determine a secondary language proficiency measure based on a percentage of interactions of the user that are related to the secondary language. As the percentage of interactions increases (i.e., the user provides and/or receives additional information in the secondary language), language proficiency manager 115 can determine a secondary language proficiency measure that is more indicative of proficiency of the user for the secondary language.

In some implementations, past interaction manager 110 can identify an audio query from the user that includes one or more terms in the secondary language, and language proficiency manager 115 can determine a secondary language proficiency measure based on user pronunciation of the one or more terms. For example, language proficiency manager 115 may compare the audio of the user uttering a phrase in the secondary language to audio of a second user that is more proficient in the secondary language uttering the same phrase. Based on the comparison, language proficiency manager 115 can determine the secondary language proficiency measure that is more indicative of proficiency when the two pronunciations are similar, and a secondary language proficiency measure that is less indicative of proficiency of the user when the pronunciation of the user is less similar to the pronunciation of a user that is more proficient in the secondary language.

Language interest manager 125 can determine a user interest measure indicative of user interest learning a secondary language. Based on the determined user interest measure satisfying a threshold, the efficiency of one or more subsequent user interactions can be improved, such as providing the user with an interface to a secondary language learning application, biasing one or more ASR models, and/or determining whether to provide the user with one or more translated phrases that have been split into sub-phrases based on the proficiency of the user. One or more signals described herein for determining a secondary language proficiency measure for the user may additionally and/or alternative be utilized to determine whether to improve efficiency of one or more user interactions. Thus, one or more techniques described herein for improving efficiency of user interactions that are related to a secondary language can be performed only in instances wherein the past interactions of the user indicate a likelihood that the user has interest in those interactions be improved. For example, an ASR model may be biased based on the secondary language proficiency measure described herein, but may only be performed in instances where past interactions of the user indicate that the user experience would be improved by biasing the speech model.

In some implementations, a secondary language interest measure can be determined based on queries that the user has submitted in a secondary language. Initially, the user interest measure can be based on the user submitting queries. As the user submits additional queries, the quality of the grammar in the queries and/or vocabulary utilized by the user in submitting queries can be an indication of continued interest of the user in learning a secondary language, which can be utilized to determine to provide additional secondary language learning tools to the user, bias an ASR model, and/or perform other actions that improve the efficiency of user interactions related to the secondary language. In some implementations, additional queries that are related to inquiring pronunciations of terms and/or requesting translations of phrases and/or terms into the secondary language can be utilized to determine a language interest measure for the user.

In some implementations, user interactions with other applications and/or webpages (or requests for additional information related to learning a secondary language) can be utilized to determine a user interest in learning a secondary language. For example, a user may access an application that is directed to learning a secondary language and/or may browse one or more webpages that are directed to language learning. A secondary language interest measure can be determined based on frequency of utilizing and/or viewing applications and/or webpages (e.g., increased usage can be an indication of continued interest). Further, decreased usage of secondary language learning applications and/or other resources can be an indication that the user no longer has interest in learning a secondary language, and the user interest measure may be adjusted accordingly.

Once past interactions manager 110 identifies interactions of the user that are related to learning a secondary language, and provides the interactions to language proficiency manager 115 to determine a secondary language proficiency measure and/or to language interest manager 125 to determine a user interest measure indicative of user interest in learning a secondary language, efficiency of one or more subsequent interactions can improve by adjusting and/or performing one or more actions that are related to the user learning the secondary language. For example, a language learning application may be populated with information that is indicative of user proficiency, and the application can be provided to the user (or an account registration interface for the application) based on the user interest measure satisfying a threshold interest level. Also, for example, an ASR model can be adjusted to bias to one or more terms and/or vocabulary rules that are indicative of user proficiency in the secondary language, such as biasing the ASR to recognize terms that are commonly utilized by a user with the determined secondary language proficiency measure. Also, for example, translations of terms and/or phrases initiated by the user may be provided to the user in sub-phrases that are split based on the secondary language proficiency measure of the user.

Figure 2:
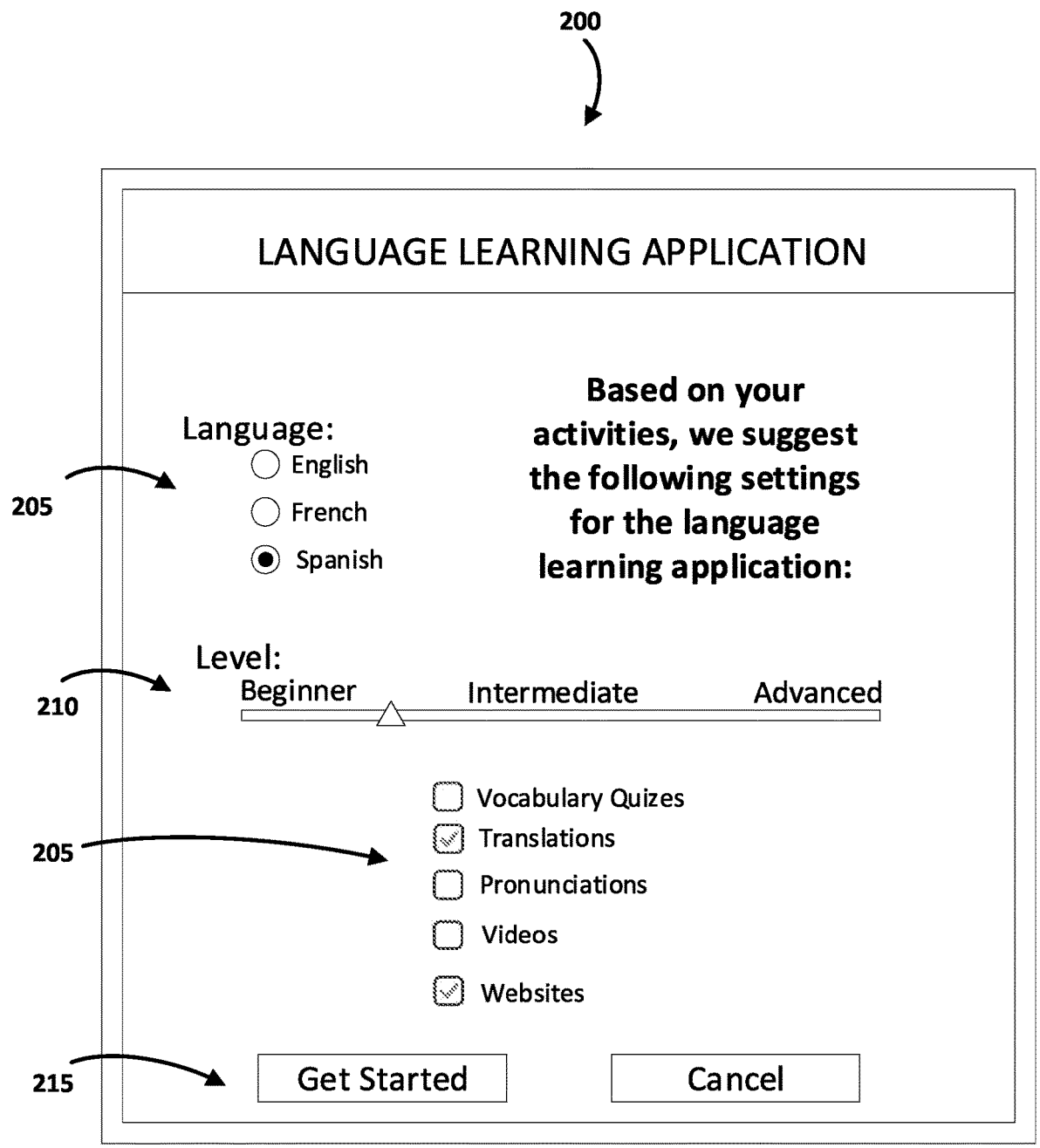
FIG. 2 is an illustration of an example graphical user interface that may be utilized for one or more implementations described herein.

In some implementations, one or more parameters of a plurality of adjustable parameters of an interface for a language learning application can be pre-filled with values based on the determined secondary language proficiency measure that has been determined for the user. For example, referring to FIG. 2, an interface 200 of a language learning application is provided. Once language proficiency manager 115 determines a secondary language proficiency measure (and, in some instances, language interest manager 125 has determined user interest in being provided a secondary language learning application), the interface 200 can be provided to the user. As illustrated, interface 200 includes a language selection section 205 that has been pre-filled with the "Spanish" radio button selected. This selection can be determined based on, for example, past interaction manager 110 identifying past interactions of the user that are related to Spanish language learning. Further, the interface 200 includes a user language level slide bar 210 that is set to a value between beginner and intermediate. This can be determined by a component that shares one or more characteristics with language proficiency manager 115, as described herein.

Interest category selection area 205 of interface 200 includes a plurality of types of content that a user may be interested in being provided. As illustrated, categories of "translations" and "websites" have been selected. The auto-filled selections of the content can be based on, for example, determining what the user has viewed and/or interacted with in past interactions. For example, a user may issue a threshold number of translation requests in past interactions, and "translations" may be automatically selected in the interest category selection area for the user based the threshold quantity of translation requests. In some implementations, interest category selections may not be provided to the user and instead the user may be automatically provided with a variety of content, such as quizzes via the secondary language learning application, secondary language websites, videos, and/or other content.

Button 215 allows the user to indicate confirmatory input to submit the parameters of the interface 200 in order to initialize and/or update a language learning application. In some implementations, the user may be provided with the interface automatically, given an opportunity to adjust one or more of the parameters, and submit the values of the parameters to then be provided with the language learning application. The provided language learning application may then provide content to the user based on the secondary language proficiency of the user and/or the interests of the user. The language learning application may provide, among other content, games, puzzles, quizzes, videos, pronunciations of vocabulary, and/or other content that can assist the user in learning the secondary language.

In some implementations, the user may be provided with prompts and/or other indications of the language learning application based on the user interest measure of the user. For example, based on identifying that the user is interacting with the language learning application and/or continuing to interact with other sources of secondary language information, the user may be provided with a reminder (e.g., daily notification on a smart device) to utilize the language learning application. Also, for example, if the user interest measure of the user changes to indicate a decreased interest in being provided with additional information related to learning a secondary language, notifications and/or other indications may be provided less frequently and/or less prominently. Conversely, if the user interacts with secondary language learning sources less frequently, the user may be provided with more frequent notifications to remind the user of the language learning application and encourage continued study of the secondary language.

In some implementations, the user may be provided with the interface 200 and/or a similar interface when one or more measures for the user are adjusted. For example, the user may become more proficient in the secondary language as the user interacts with the language learning application and/or other sources. As past interactions manager 110 identifies the continued interactions of the user, language proficiency manager 115 may determine that the language proficiency of the user has increased (e.g., use of additional vocabulary, viewing secondary language videos without translations, better grammar in queries). Language proficiency manager 115 may provide updated values for one or more parameters to graphical user interface manager 130, which may provide the user with interface 200 (or a similar interface) to allow the user to view and/or adjust the updated values for the parameters. For example, graphical user interface manager 130 may provide interface 200 with the slide bar 210 indicating an "intermediate" proficiency level. The user may select button 215 to continue with the adjusted values and/or adjust the values manually before continuing use of the language learning application.

Automatic speech recognizer 135 receives audio data that includes a user uttering a phrase, such as via microphone 101, and recognizes speech for further processing. For example, a user can utter a phrase that is captured by microphone 101, automatic speech recognizer 135 can process the speech to determine the intent and/or terms in the phrase, and one or more components can further process the recognized phrase. This can include, for example, interacting with one or more applications, utilizing speech to text (STT) to determine a textual representation of the speech, and/or performing translations of terms into a secondary language, as described herein.

In some implementations, language proficiency manager 125 can determine a secondary language proficiency measure that can be utilized to increase the accuracy of automatic speech recognition (ASR) that is performed by automatic speech recognizer 135 on secondary language spoken utterances of the user that are in the secondary language. For instance, based on the secondary language proficiency measure, automatic speech recognizer 135 (or another component that can provide automatic speech recognizer with one or more terms to bias in speech recognition) select, from a superset of terms for the secondary language, a subset of terms for the secondary language. Automatic speech recognizer 135 can utilize the selected subset of terms to bias an automatic speech recognition model that is configured to recognize speech that is performed in the secondary language utterances of the user. The subset of terms can include, for example, terms that the user is likely to be learning based on the secondary language proficiency measure and can optionally exclude term(s) that the user is unlikely to be learning and/or has already mastered. The secondary language ASR can be utilized in processing spoken utterances of the user that are provided in interactions with the language learning application, in general interactions of the user with an automated assistant, and/or other interactions of the user.

In some implementations, the secondary language proficiency measure that is determined by language proficiency manager 115 can be utilized to provide a user with translations of terms and/or phrases of interest that are provided by the user. The user can provide a query, either textually and/or audibly, that may require a response that is in the secondary language. For example, the user may submit the query "How do you say good morning in Spanish." The request to translate one or more terms into the secondary language can result in phrases of varying lengths, based on the complexity of the request. In some instances, a translated phrase may be better comprehended by the user if the translation (or other responses that are in the secondary language) are split into smaller portions and provided to the user separately. Phrases may be split based on the secondary proficiency measure of the user such that more proficient speakers can be provided with larger portions of the response than a less proficient speaker. For example, natural language output text can be split into a plurality of subtexts, where a quantity of the subtexts and/or an amount of text in each of the subtexts can be determined based on the secondary language proficiency measure. Generally, more subtexts and/or smaller size subtexts will be provided with a low secondary language proficiency measure while lesser subtexts and/or larger size subtexts will be provided with a higher secondary language proficiency measure. This can make the output more understandable (through more and/or smaller subtexts) for a lesser proficiency user, while making the rendering shorter (in the case of audible rendering) and/or take up less screen real estate (in the case of visual rendering) for a higher proficiency user.

Figure 3A:
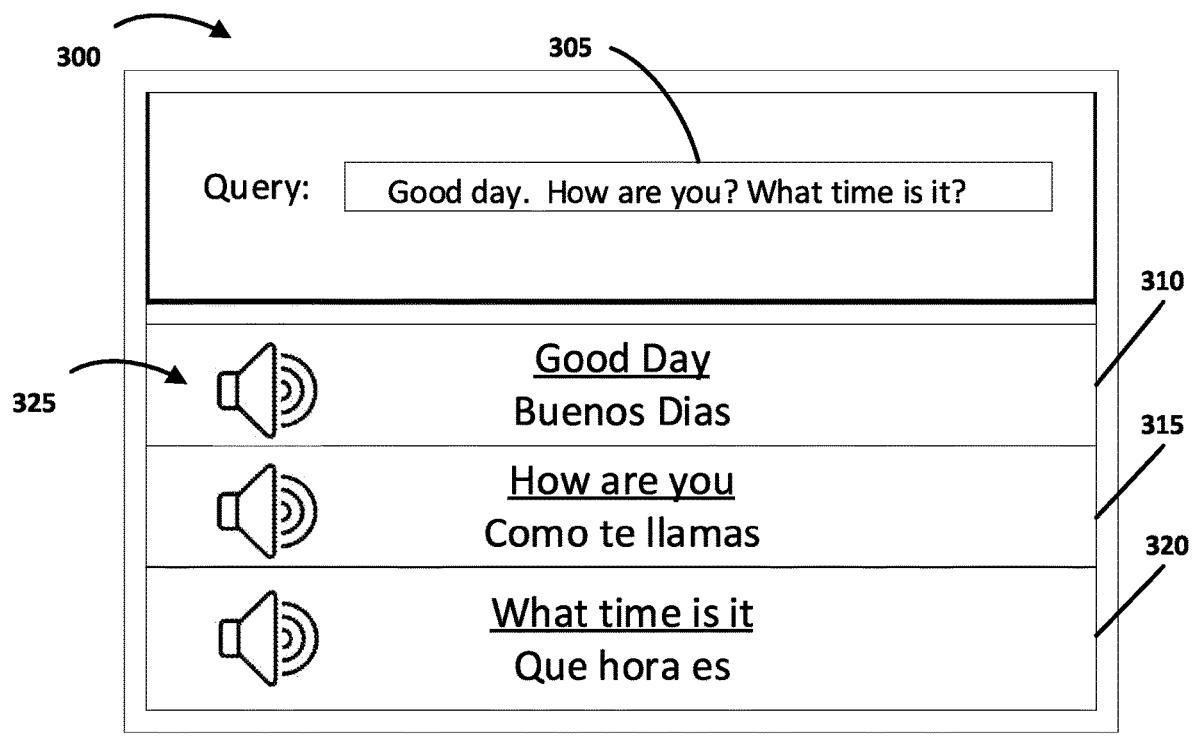
FIG. 3A and FIG. 3B are an illustration of an example graphical user interface that may be utilized for one or more implementations described herein.
Figure 3B:
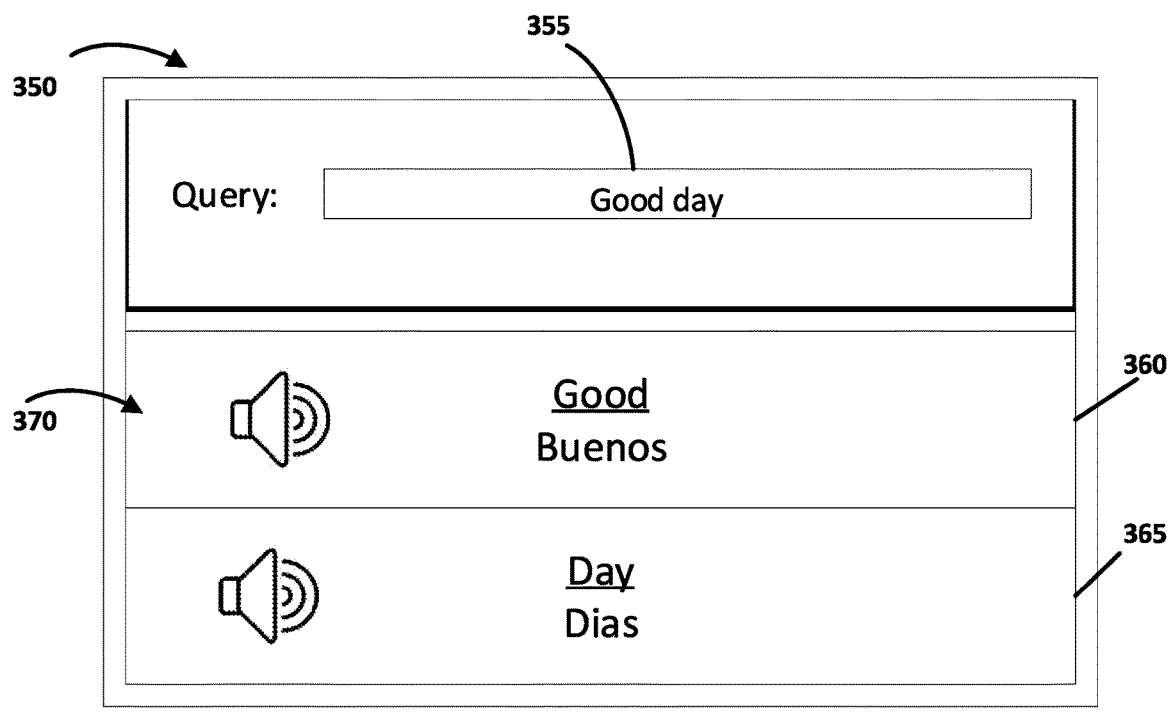

Referring to FIGS. 3A and 3B, example graphical user interfaces are illustrated that may be utilized with one or more implementations described herein. Interface 300 may be provided to a user that has a language proficiency score that is more indicative of language proficiency than interface 350. In some implementations, one or more components may be absent from an interface that is provided to a user and/or provided interface(s) may have additional components not illustrated in FIGS. 3A and 3B Query box 305 includes a query that is provided to a user. In some implementations, the query may be included in audio data that is captured via microphone 101 and processed by automatic speech recognizer 135 and/or a text-to-speech model. In some implementations, the query may be provided by the user as text via one or more interfaces and/or via interface 300. Similarly, query box 355 includes a query that may be provided by a user via speech and/or via a text query.

In some implementations, a query may include an indication that the user has interest in translating a term and/or phrase into a secondary language. As illustrated, the query "Good day. How are you? What time is it?" has been provided by the user into an interface that is configured to receive terms and/or phrases for translation. In some implementations, the user may provide a query via a general interface (e.g., graphical user interface, automated assistant) and indicate in the query the interest in having the term and/or phrase translated. For example, a user may utter the query "translate good day into Spanish" and, in response, can be provided with interface 350.

Referring to interface 300, the user has requested a translation of "good day. How are you? What time is it?" and has been provided with a translation of the phrase as three subtexts 310, 315, and 320. In some implementations, the language proficiency measure for the user may be utilized to determine how to split the translation (or other response in the secondary language) into the subtexts. As illustrated, the user is provided with a first subtext 310 "Buenos dias" as a single phrase with multiple terms. In some implementations, the first subtext 310 may be determined based on terms and/or phrases that the user has previously encountered in past interactions, terms and/or phrases of a reasonable length for a typical user with the proficiency of the user, and/or other indications that may be inferred from the language proficiency measure. In some implementations, the first subtext may be determined based on how proficient the user is in the secondary language, with higher proficiency resulting in larger and/or more complex subtexts. The second subtext 315 includes the translation "Como the llamas" and the third subtext 320 includes the translation "Que hora es." Thus, for the language proficiency measure of the user, each of the sentences of the query has been provided as a separate subtext.

In some implementations, the user may be provided with more or fewer subtexts based on the user language proficiency measure. For example, referring to interface 350, the user has submitted the phrase "good day," which has been split into two subtexts 360 and 365. As an example, the user that submitted the phrase in interface 350 may have a lower proficiency measure such that, instead of being provided with "buenos dias" as a single subtext, such as subtext 310, the user has been provided with each word separately. Thus, because the user that submitted query 355 has a lower language proficiency measure, subtexts may be shorter, may have new and/or complex vocabulary provided as its own subtext, and/or may otherwise be split and provided to the user based on the determined language proficiency measure for the user.

In addition to a textual translation of the query 305, each of the subtexts is provided with an icon 325 that, when interacted with, can provide the user with audio, via speaker 102, of the subtexts being uttered. For example, if a user interacts with icon 325 (e.g., touches the icon on a touchscreen), the user can be provided with audio of a speaker uttering "buenos dias." Similarly, if a user interacts with icon 370, the user may be provided with audio that includes a speaker uttering "buenos." Audio may be generated from, for example, a recording of a user uttering the phrase and/or via a text-to-speech component.

Figure 4:
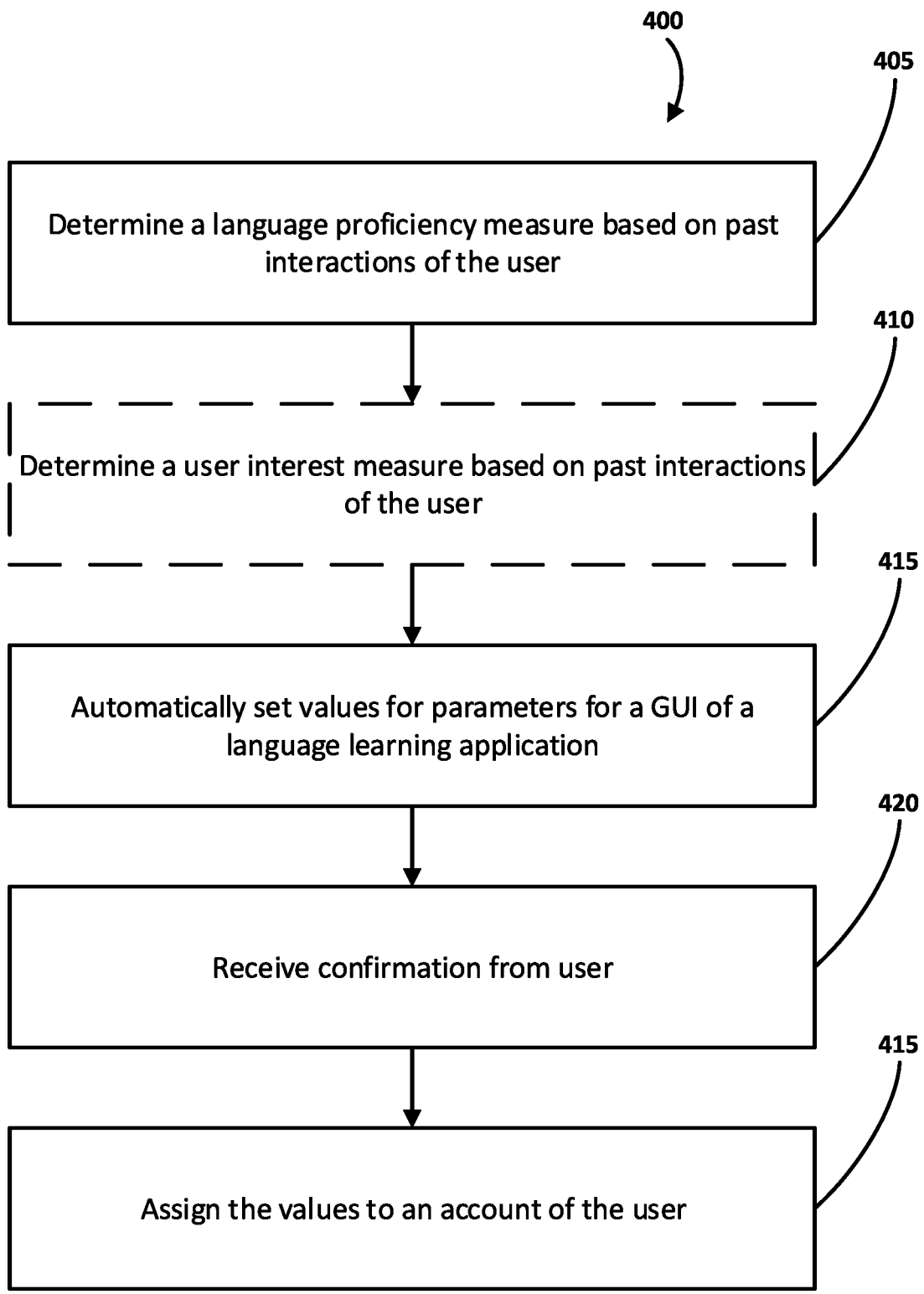
FIG. 4 is a flowchart of one or more implementations described herein.

Referring to FIG. 4, a flowchart 400 is provided that illustrates implementations described herein. In some implementations, one or more steps may be absent, one or more additional steps may be performed, and/or the illustrated steps may be performed in a different order. For example, as illustrated, step 410 is an optional step that may be performed before step 405 and/or may not be performed at all.

At step 405, a language proficiency measure is determined based on past interactions of the user. Past interactions may be identified by a component that shares one or more characteristics with past interactions manager 110 of FIG. 1. Further, a secondary language proficiency measure can be determined by language proficiency manager 115, as described herein. In some implementations, past interactions of the user may include resources that are viewed by the user, such as webpages and videos, queries submitted by the user, such as search requests and requests for translations, and/or interactions with other applications.

In some implementations, the language proficiency measure can be determined, based at least in part, on similarity between one or more of the past interactions. For example, a user may issue the same translation query repeatedly, which may indicate that the terms of the translation are currently being learned by the user. Also, for example, repeated viewing of a video in a secondary language of the user may be indicative of the proficiency of the user in the secondary language. Also, for example, a user viewing multiple webpages that are of a similar proficiency level (e.g., viewing multiple webpages with beginner vocabulary) may be indicative of the proficiency level of the user.

In some implementations, the language proficiency measure can be determined, based at least in part, on complexity of one or more of the past interactions. For example, a low proficiency measure may be determined, at least in part, for a user that issues beginner queries with low complexity (e.g., "How do you say hello in Spanish"). Also, for example, a higher proficiency measure may be determined, at least in part, for a user that issues more complex queries (e.g., "How do you say 'what will the weather be like next Thursday' in Spanish").

In some implementations, the language proficiency measure can be determined, at least in part, by identifying errors in one or more past interactions of the user. For example, a user may submit a query in the secondary language that includes one or more grammatical errors, incorrect usage of terms, and/or other errors that are less likely to be in queries submitted by user with a primary language of the secondary language of the user. As errors in queries are less frequent and/or more complex errors, the secondary proficiency measure of the user may be updated to a value that is more indicative of proficiency. Thus, a user that makes fewer errors may have a higher proficiency measure than a second user who makes more errors and/or makes more frequent errors. Further, the types of errors that are made by the user may be utilized to determine what type of content to provide to the user and/or to target particular content to assist the user in learning the secondary language.

At optional step 410, a user interest measure is determined for the user based on the past interactions of the user. The past interactions that are utilized to determine the user interest measure can include one or more of the past interactions that may be utilized to determine the language proficiency measure of step 405. In some implementations, the user interest measure can be determined by a component that shares one or more characteristics with language interest manager 125. For example, as the quantity of interactions related to the secondary language increases, the user interest measure may increase to indicate continued and/or increasing interest in being provided with a language learning application.

At step 415, values for one or more parameters for a graphical user interface of a language learning application are automatically set. For example, a component that shares one or more characteristics with graphical interface manager 130 may generate an interface that shares one or more characteristics with interface 200 of FIG. 2 and described herein. In some implementations, the parameters may include a user proficiency level that may be preset in the interface such that, when the language learning application is provided to the user, the content that is provided is appropriate for the learning level of the user. At step 420, confirmatory input is received from the user. This may include, for example, the user interacting with the provided interface 200, such as by selecting a button, such as button 215 of FIG. 2.

At step 425, the values that were set in step 415 are assigned to an account of the user. The values may be assigned to the user by a component that shares one or more characteristics with user account manager 120. For example, once the user confirms the prefilled values of interface 200, the values can be store by user account manager 120 for usage by the language learning application.

Figure 5:
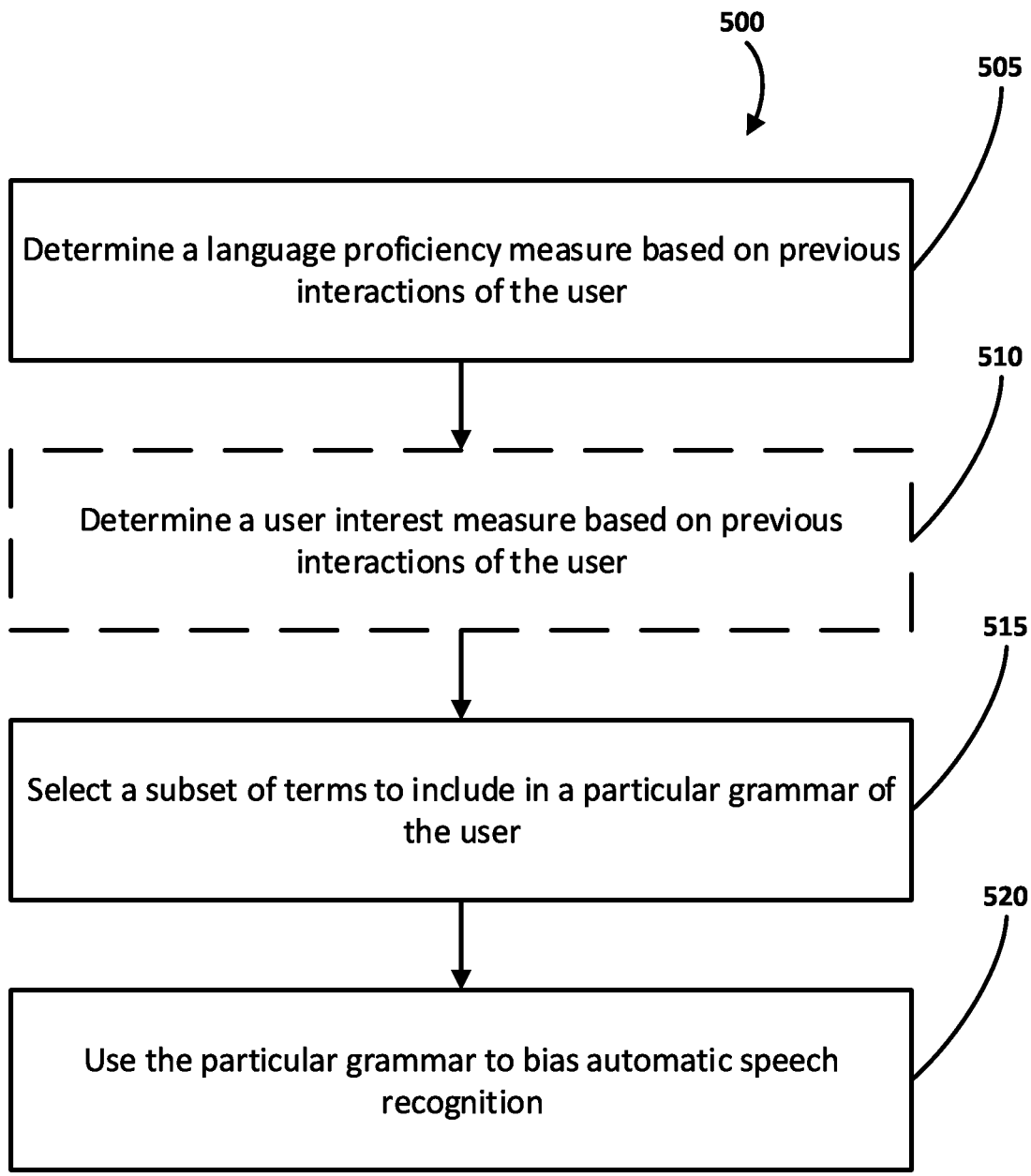
FIG. 5 is a flowchart of one or more additional implementations described herein.

Referring to FIG. 5, a flowchart 500 is provided that illustrates implementations described herein. In some implementations, one or more steps may be absent, one or more additional steps may be performed, and/or the illustrated steps may be performed in a different order. For example, as illustrated, step 510 is an optional step that may be performed before step 405 and/or may not be performed at all.

At step 505, a language proficiency measure is determined based on past interactions of the user. This step can share one or more characteristics with step 405 of FIG. 4. For example, previous interactions of the user may include identifying resources that were viewed by the user, previous queries of the user, previous translation requests of the user, and/or other interactions described herein.

At optional step 510, a user interest measure is determined for the user based on the past interactions of the user. Step 510 may share one or more characteristics with step 410 of FIG. 4. For example, based on determining a user interest measure from past interactions of the user, one or more subsequent steps can be performed. Thus, by taking into account a user interest measure, additional steps may be optionally performed only when the user interest satisfies a threshold.

At step 515, a subset of terms are determined for the user in the particular language. The terms may include one or more terms that the user has utilized in past interactions and/or terms that are appropriate for the language proficiency measure of the user that was determined at step 505. For example, the user may issue a query in the particular language a threshold number of times and/or otherwise indicate common usage of terms that can be included in the subset of terms in the particular language.

At step 520, the particular grammar that includes the subset of terms is used to bias automatic speech recognition. Speech recognition can be performed by a component that shares one or more characteristics with automatic speech recognizer 135. For example, an automatics speech recognition model may be configured to recognize terms of the particular grammar such that, in instances where the user utters a phrase that includes the particular language (as opposed to the primary language of which the ASR is configured to recognize), the ASR can more likely recognize the terms in the particular language.

Figure 6:
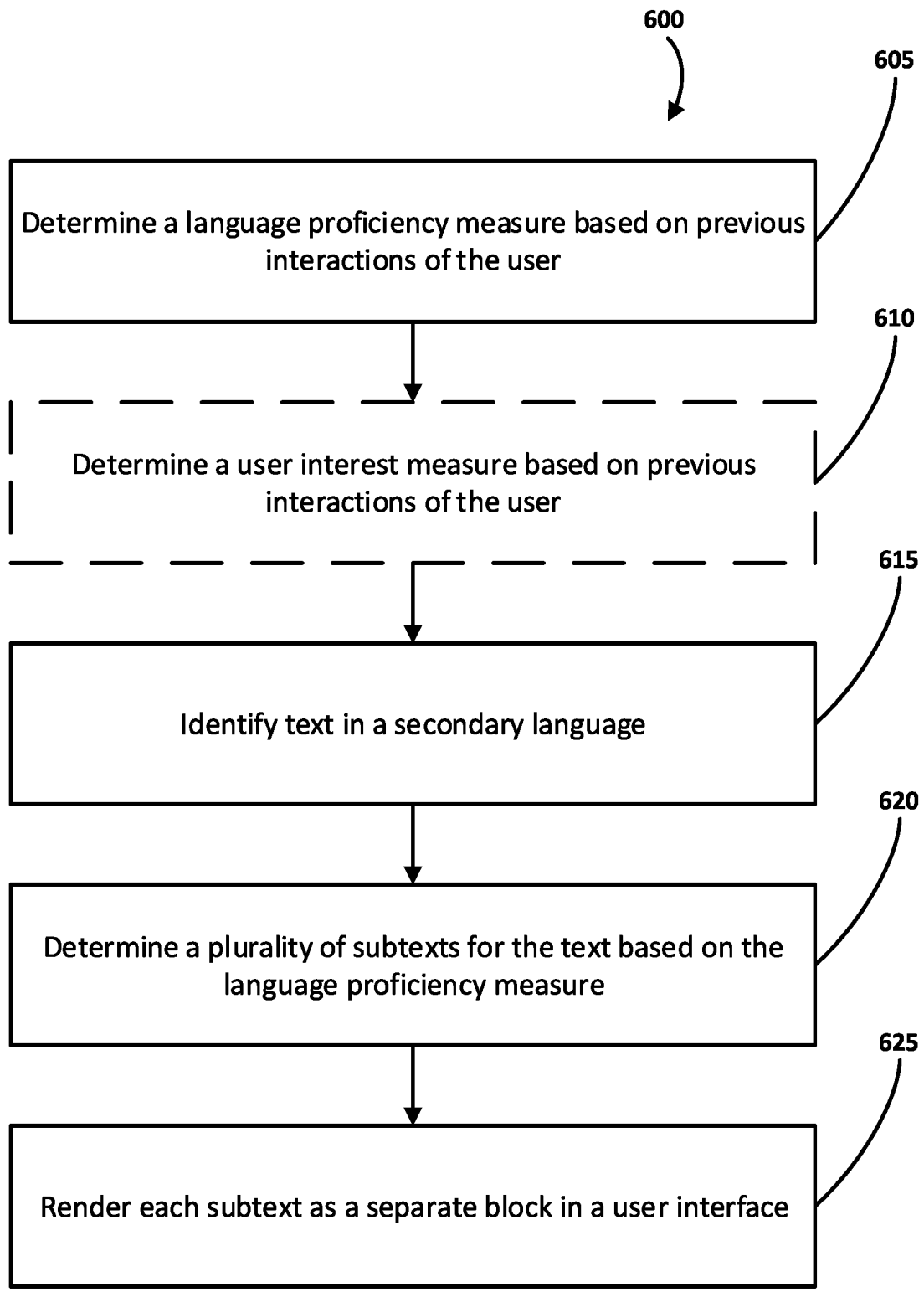
FIG. 6 is a flowchart of one or more additional implementations described herein.

Referring to FIG. 6, a flowchart 600 is provided that illustrates implementations described herein. In some implementations, one or more steps may be absent, one or more additional steps may be performed, and/or the illustrated steps may be performed in a different order. For example, as illustrated, step 610 is an optional step that may be performed before step 405 and/or may not be performed at all.

At step 605, a language proficiency measure is determined based on past interactions of the user. This step can share one or more characteristics with step 405 of FIG. 4. For example, previous interactions of the user may include identifying resources that were viewed by the user, previous queries of the user, previous translation requests of the user, and/or other interactions described herein.

At optional step 610, a user interest measure is determined for the user based on the past interactions of the user. Step 610 may share one or more characteristics with step 410 of FIG. 4. For example, based on determining a user interest measure from past interactions of the user, one or more subsequent steps can be performed. Thus, by taking into account a user interest measure, additional steps may be optionally performed only when the user interest satisfies a threshold.

At step 615, a text in a secondary language is identified. The text can include a request to translate a phrase into a secondary language and/or otherwise be a request that can result in a phrase in the secondary language. As an example, the user may submit a request of "How do you say good morning in Spanish." In some implementations, the requested text can be translated into Spanish for further processing, as described herein.

At step 620, a plurality of subtexts are determined for the text in the secondary language based on the language proficiency measure of the user. The length of one or more of the subtexts is determined based on the language proficiency measure of the user such that a user with a lower language proficiency measure may be provided subtexts that are shorter in length than a user with a high language proficiency measure. For example, for a text of "buenos dias," a first user may be provided the text as a single subtext whereas a second user with a lower language proficiency measure may be provided with a first subtext of "buenos" and a second subtext of "dias."

At step 625, each subtext is rendered as a separate block in a user interface that is provided to the user. For example, subtexts may be rendered by a component that shares one or more characteristics with graphical user interface manager 130 and may provide an interface that shares one or more characteristics with interface 300 and/or 350 of FIGS. 3A and 3B. In some implementations, the subtexts may be provided with an interactive icon that allows the user to listen to a speaker uttering the associated subtexts. For example, icons 325 and 370 of FIGS. 3A and 3B may, when selected, cause the client device to provide audio of the related subtexts 310 and 360.

Although FIGS. 4 to 6 describe three implementations that utilize a secondary language proficiency measure to improve efficiency of subsequent interactions of the user, additional implementations may utilize any combination of the steps that are described in FIGS. 4 to 6. For example, in some implementations, a secondary language proficiency measure can be utilized to automatically set values for one or more parameters of an interface of a language learning application and further be utilized to bias an automatic speech recognition (ASR) model, as described in FIGS. 4 and 5. Also, for example, a secondary language proficiency measure can be utilized to both bias an ASR model and to provide subtexts of a text to a user, as described in FIGS. 5 and 6. Also, for example, a secondary language proficiency measure can be used to automatically set values to parameters of a language learning application interface as well as to provide subtexts to a text, as described herein and illustrated in FIGS. 4 and 6. Also, for example, a secondary language proficiency measure can be utilized to perform the steps of FIGS. 4, 5 and 6 in combination.

Figure 7:
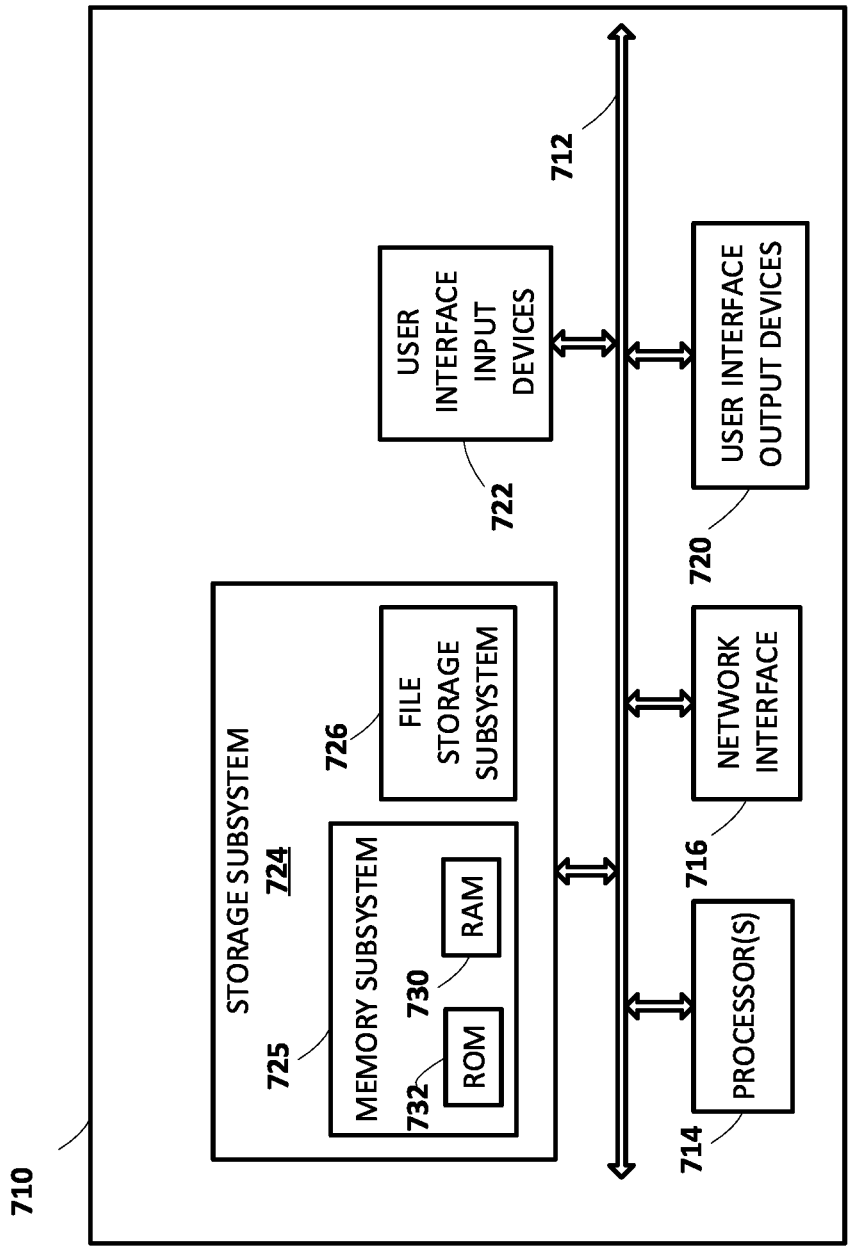
FIG. 7 illustrates an example architecture of a computing device.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory 725 and a file storage subsystem 726, user interface output devices 720, user interface input devices 722, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to perform selected aspects of method 400, method 500, and/or to implement one or more of client device 100, query processing application 105, an operating system executing query processing application 105 and/or one or more of its components, an automated assistant, and/or any other engine, module, chip, processor, application, etc., discussed herein, method 400, method 500, method 600, and/or to implement one or more of user device 100, language learning application 105 and/or one or more of its components, and/or any other engine, module, chip, processor, application, etc., discussed herein.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

In some implementations, a method implemented by one or more processors is provided and includes determining, based on processing secondary language interaction data of a user, a language proficiency measure that is specific to the user and that is specific to a secondary language that is not indicated as a primary language for an account of the user. The secondary language interaction data of the user is based on past interactions of the user, via one or more client devices associated with the account of the user, that are related to the secondary language, and the past interactions are not directed to a language learning application. The method further includes automatically setting, based on the language proficiency measure, a value for a parameter of a plurality of adjustable parameters of the settings GUI and receiving confirmatory user interface input, of the user, that is provided at the settings GUI, wherein the confirmatory user interface input confirms values for the adjustable parameters, including confirming the automatically set value for the parameter. Finally, the method further includes assigning the values to the account of the user, wherein the values, when assigned to the account of the user, dictate output rendered by the language learning application in subsequent interactions with the user.

These and other implementations of the technology disclosed herein can include one or more of the following features.

In some implementations, the method further includes determining, based on the past interactions of the user, a user interest measure indicative of user interest in learning the secondary language, determining that the user interest measure satisfies a threshold, and, in response to determining the user interest measure satisfies a threshold, and prior to the user accessing the settings GUI, causing a notification to be provided, at one of the client devices, wherein the notification, when selected, causes the language learning application to be accessed, and wherein the user is accessing the settings GUI responsive to selecting the notification. In some of those implementations, determining the user interest measure comprises determining the user interest measure based on a quantity of the past interactions that are related to the secondary language. In some implementations, determine the user interest measure includes determining the user interest measure based on identifying the user accessing media content in the secondary language In some implementations, determining the language proficiency measure includes determining the language proficiency measure based on a quantity of the past interactions that are related to the secondary language.

In some implementations, determining the language proficiency includes determining the language proficiency measure based on a quantity of the past interactions that are related to the secondary language.

In some implementations, determining the language proficiency includes determining the language proficiency measure based on similarity between one or more of the past interactions.

In some implementations, determining the language proficiency measure includes determining the language proficiency measure based on complexity of one or more of the past interactions.

In some implementations, determining the language proficiency measure includes identifying errors in one or more past interactions of the user.

In some implementations, the secondary language interaction data includes audio of the user uttering one or more terms in the secondary language, determining the language proficiency measure includes determining the language proficiency measure based on accuracy of the user in speaking the one or more terms in the secondary language.

In some implementations, the method further includes determining, based on processing subsequent secondary language interaction data of a user, an updated language proficiency measure, and updating the values assigned to the account of the user.

In other implementations, a method implemented by one or more processors is provided and includes determining, based on processing secondary language interaction data of a user, a language proficiency measure that is specific to the user and that is specific to a secondary language that is not specified as a primary language for an account of the user, wherein the secondary language interaction data of the user is based on past interactions of the user, via one or more client devices associated with the account of the user, that are related to the secondary language, and wherein the past interactions are not directed to a language learning application, selecting, from a superset of terms for the secondary language and based on the language proficiency measure, a subset of the terms to include in the particular grammar for the user, and in response to selecting the particular grammar for the user, using the particular grammar in biasing automatic speech recognition of a spoken utterance of the user, wherein the automatic speech recognition is performed using a speech recognition model for the secondary language.

In some of those implementations, the method further includes receiving a spoken query from the user, wherein the spoken query includes one or more terms of the grammar, determining, utilizing the one or more speech recognition models, a textual representation of the spoken query, and determining a response to the spoken query. In others of those implementations, the response includes a suggestion for pronunciation of one or more of the terms of the grammar that are included in the spoken query. In others of those implementations, the response includes a suggestion for correcting one or more grammatical errors in the spoken query.

In some implementations, the method further includes receiving one or more additional queries from the user, wherein the one or more additional queries include one or more terms in the secondary language that are not part of the selected grammar, adjusting the language proficiency score based on the one or more terms in the secondary language that are not part of the selected grammar, and adding one or more of the terms in the secondary language to the grammar.

In yet others of the implementations, a method implemented by one or more processors is provided and includes determining, based on processing secondary language interaction data of a user, a language proficiency measure that is specific to the user and that is specific to a secondary language that is not specified as a primary language for an account of the user, wherein the secondary language interaction data of the user is based on past interactions of the user, via one or more client devices associated with the account of the user, that are related to the secondary language; identifying text in the secondary language; determining a plurality of subtexts for the text, wherein a size of at least one of the subtexts is determined based on the secondary language proficiency measure; and rendering each subtext as a separate block in a user interface along with a corresponding interactive icon that, when interacted with, causes the user to be provided with audio of the corresponding text being read.

In some of those implementations, the method further includes receiving audio of a user uttering a phrase, generating a response to the phrase, wherein the response is in the secondary language, and generating the text based on the response. In some of those implementations, generating the response includes translating the phrase into the secondary language, wherein the text is a translated version of the phrase.

Some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the methods described herein. Some implementations additionally or alternatively include one or more non-transitory computer readable storage media storing computer instructions executable by one or more processors to perform any of the methods described herein.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before the data is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A method implemented by one or more processors, the method comprising:
   determining, based on processing secondary language interaction data of a user, a language proficiency measure that is specific to the user and that is specific to a secondary language that is not specified as a primary language for an account of the user,
      wherein the secondary language interaction data of the user is based on past interactions of the user, via one or more client devices associated with the account of the user, that are related to the secondary language, and wherein the past interactions are not directed to a language learning application;

determining, based on the past interactions of the user, a user interest measure indicative of user interest in learning the secondary language;

determining that the user interest measure satisfies a threshold;

selecting, from a superset of terms for the secondary language and based on the language proficiency measure, a subset of the terms to include in a particular grammar for the user; and in response to selecting the particular grammar for the user and in response to determining that the user interest measure satisfies the threshold:

using the particular grammar in biasing automatic speech recognition of a spoken utterance of the user, wherein the automatic speech recognition is performed using a speech recognition model for the secondary language.

2. The method of claim 1, further comprising:

receiving a spoken query from the user, wherein the spoken query includes one or more terms of the particular grammar;

determining, utilizing one or more speech recognition models, a textual representation of the spoken query; and determining a response to the spoken query.

3. The method of claim 2, further comprising:

providing the response to the user, wherein the response includes one or more terms of the particular grammar.

4. The method of claim 2, wherein the response includes a suggestion for pronunciation of one or more of the terms of the particular grammar that are included in the spoken query.

5. The method of claim 2, wherein the response includes a suggestion for correcting one or more grammatical errors in the spoken query.

6. The method of claim 1, further comprising:

receiving one or more additional queries from the user, wherein the one or more additional queries include one or more terms in the secondary language that are not part of the particular grammar;

adjusting the language proficiency score based on the one or more terms in the secondary language that are not part of the particular grammar; and adding one or more of the terms in the secondary language to the particular grammar.

7. The method of claim 1, wherein determining the language proficiency measure comprises:

determining the language proficiency measure based on a quantity of the past interactions that are related to the secondary language.

8. The method of claim 1, wherein determining the language proficiency measure comprises:

determining the language proficiency measure based on similarity between one or more of the past interactions.

9. The method of claim 1, wherein determining the language proficiency measure comprises:

determining the language proficiency measure based on complexity of one or more of the past interactions.

10. The method of claim 1, wherein determining the language proficiency measure comprises:

identifying errors in one or more past interactions of the user.

11. A system, comprising:

memory and one or more processors, the memory storing instructions that, when executed by the one or more processors, cause the one or more processors to:

determine, based on processing secondary language interaction data of a user, a language proficiency measure that is specific to the user and that is specific to a secondary language that is not specified as a primary language for an account of the user, wherein the secondary language interaction data of the user is based on past interactions of the user, via one or more client devices associated with the account of the user, that are related to the secondary language, and wherein the past interactions are not directed to a language learning application;

determine, based on the past interactions of the user, a user interest measure indicative of user interest in learning the secondary language;

determine that the user interest measure satisfies a threshold;

select, from a superset of terms for the secondary language and based on the language proficiency measure, a subset of the terms to include in a particular grammar for the user; and in response to selecting the particular grammar for the user and in response to determining that the user interest measure satisfies the threshold:

use the particular grammar in biasing automatic speech recognition of a spoken utterance of the user, wherein the automatic speech recognition is performed using a speech recognition model for the secondary language.

12. The system of claim 11, wherein the instructions further cause the one or more processors to:

receive a spoken query from the user, wherein the spoken query includes one or more terms of the particular grammar;

determine, utilizing one or more speech recognition models, a textual representation of the spoken query; and determine a response to the spoken query.

13. The system of claim 12, wherein the instructions further cause the one or more processors to:

provide the response to the user, wherein the response includes one or more terms of the particular grammar.

14. The system of claim 12, wherein the response includes a suggestion for pronunciation of one or more of the terms of the particular grammar that are included in the spoken query.

15. The system of claim 12, wherein the response includes a suggestion for correcting one or more grammatical errors in the spoken query.

16. At least one non-transitory computer-readable medium comprising instructions that, in response to execution of the instructions by one or more processors, cause the one or more processors to perform the following operations:

determining, based on processing secondary language interaction data of a user, a language proficiency measure that is specific to the user and that is specific to a secondary language that is not specified as a primary language for an account of the user, wherein the secondary language interaction data of the user is based on past interactions of the user, via one or more client devices associated with the account of the user, that are related to the secondary language, and wherein the past interactions are not directed to a language learning application;

determining, based on the past interactions of the user, a user interest measure indicative of user interest in learning the secondary language;

determining that the user interest measure satisfies a threshold;

selecting, from a superset of terms for the secondary language and based on the language proficiency measure, a subset of the terms to include in a particular grammar for the user; and in response to selecting the particular grammar for the user and in response to determining that the user interest measure satisfies the threshold:
  using the particular grammar in biasing automatic speech recognition of a spoken utterance of the user, wherein the automatic speech recognition is performed using a speech recognition model for the secondary language.

17. The at least one non-transitory computer-readable medium of claim 16, wherein the instructions further include:

receiving a spoken query from the user, wherein the spoken query includes one or more terms of the particular grammar;

determining, utilizing one or more speech recognition models, a textual representation of the spoken query; and determining a response to the spoken query.

18. The at least one non-transitory computer-readable medium of claim 17, wherein the instructions further include:

providing the response to the user, wherein the response includes one or more terms of the particular grammar.

19. The at least one non-transitory computer-readable medium of claim 17, wherein the response includes a suggestion for pronunciation of one or more of the terms of the particular grammar that are included in the spoken query.

* * * * *